June 30, 1964  J. BAJER  3,139,152
ENGINE MOUNT
Filed April 18, 1961  2 Sheets-Sheet 2
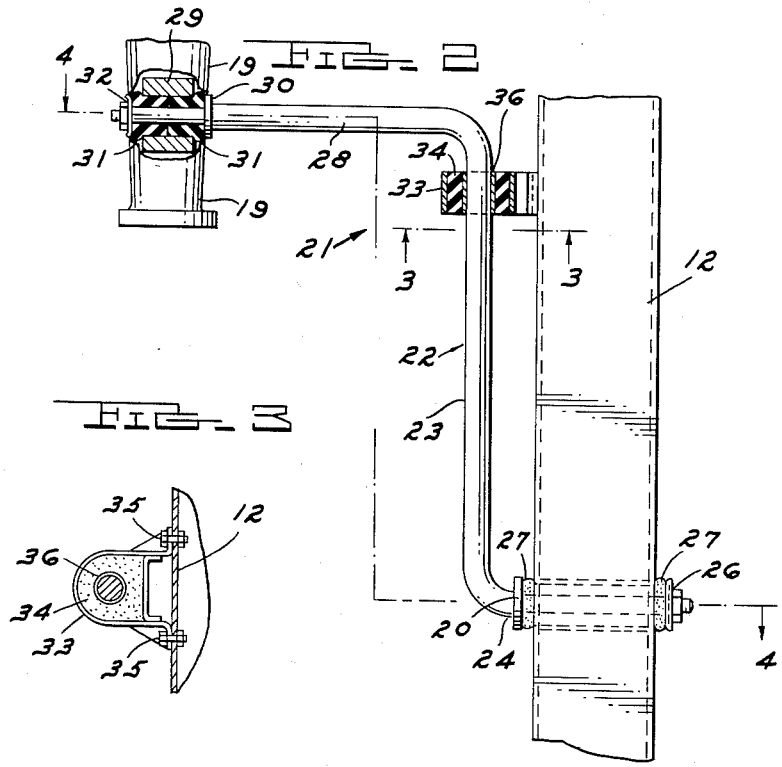
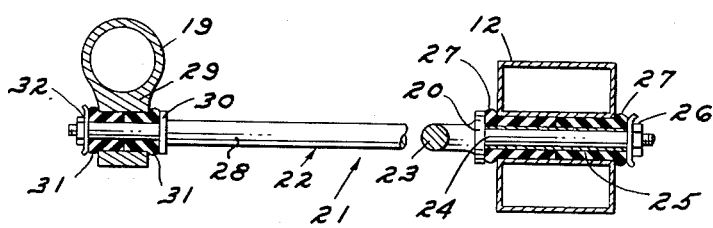
JACQUES BAJER
INVENTOR.
BY John R. Faulkner
Thomas H. Oster
ATTORNEYS United States Patent Office 3,139,152
Patented June 30, 1964

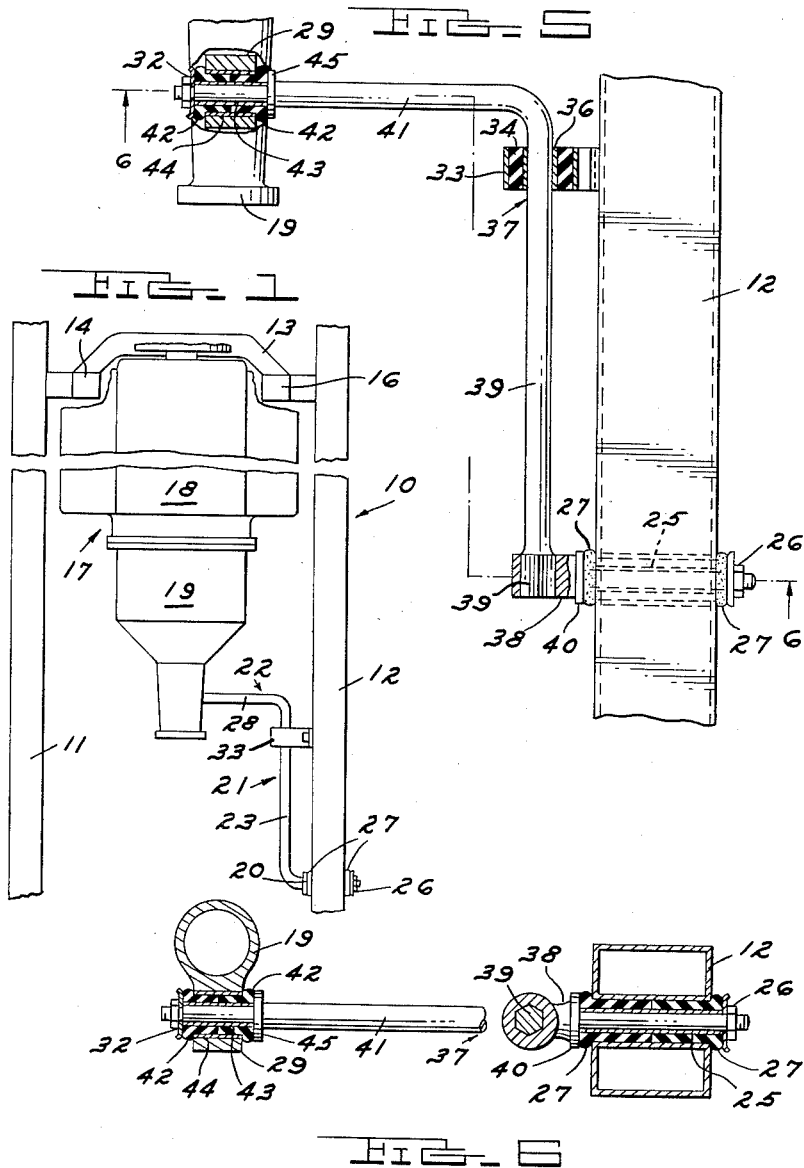

3,139,152
ENGINE MOUNT
Jacques Bajer, Dearborn, Mich., assignor to Ford Motor Company, Dearborn, Mich., a corporation of Delaware
Filed Apr. 18, 1961, Ser. No. 103,880
7 Claims. (Cl. 180—64)

This invention relates to a mounting for a power unit. More specifically it relates to a torsion bar engine mount.

An engine mount has several important functions. It must support and stabilize the power unit upon and relative to the frame support member upon which it is mounted. It must satisfactorily isolate the power unit from the frame support member to avoid the transference of movements and vibrations between the power unit and the frame support member. It also must damp vibrations of the power unit to prevent resonance between vibrations of the power unit and the frame support member.

In an embodiment of this invention a torsion bar engine mount is used that has one portion anchored to a frame support member and another portion connected to a part of the power unit. Power unit vertical movement is translated into torsional movement of the torsion bar. Supporting means are provided on the frame support member having a preloaded elastomer member in which the intermediate portion of the torsion bar is journaled. The torsion bar restrains the power unit from lateral, fore and aft movement while the elastomer member in the supporting means provides both isolation and damping of vibrations at the support.

One of the objects of this invention is to provide an engine mount that will satisfactorily support and stabilize a power unit upon a frame structure and keep the vibrations passing between said power unit and said frame structure to an acceptable minimum.

Another object of this invention is to provide a compact engine mount which dampens vibrations between an engine and its support.

Still another object of this invention is to provide a torsion bar engine mount that will satisfactorily support the engine with a minimum of transference of vibrations between the engine and its frame.

Still another object of this invention is to provide an engine mount that requires a minimum of installation room.

Still a further object of this invention is to provide a torsion bar rear engine mount having one portion anchored to the frame structure and another portion connected to the engine.

Still a further object of this invention is to provide an engine support simple in construction, easy to assemble and disassemble, and dependable in operation.

Other objects and advantages of this invention will become more apparent when considered in connection with the accompanying drawings, wherein:

FIGURE 1 is a fragmentary plan view of a motor vehicle power unit and frame member embodying the invention, and FIGURE 2 is a fragmentary plan view of a portion of the frame support member and the rear portion of the power unit and embodying a form of the invention, and FIGURE 3 is a sectional view taken on the plane indicated by the line 3—3 of FIGURE 2, and FIGURE 4 is a sectional view taken on the plane indicated by the line 4—4 of FIGURE 2, and FIGURE 5 is a fragmentary plan view of a portion of the frame member and the rear portion of the power unit and embodying an alternate form of the invention, and FIGURE 6 is a sectional view taken on the plane indicated by the line 6—6 of FIGURE 5.

The expression "power unit" as used in this specification and claims is intended to include, of course, any prime mover such as a reciprocating engine and any unit that is integrally connected to the engine, such as the transmission and in some instances the differential or transfer case. The term "frame" is intended to include that structure upon which a power unit is mounted, such as frame, frame cross-member, "X" member, body-frame combination, portable framework, et cetera.

Referring now to the drawings and in particular FIGURE 1, a fragmentary portion of the motor vehicle is shown at 10 having a pair of side frame members 11 and 12 and a connected cross member 13. A pair of conventional, resilient front engine supports indicated at 14 and 16 may be used to support the front portion of a power unit 17 comprising an internal combustion engine 18 and connected transmission 19. The rear portion of the power unit 17 or the transmission 19 is supported by a rear engine mount indicated at 21.

Referring now to FIGURES 2-4, rear engine mount 21 comprises a torsion bar 22 having an intermediate portion 23 which may extend substantially parallel to the longitudinal axis of the motor vehicle. One end of the torsion bar intermediate portion 23 is provided with an integral crank arm anchor portion 24. Anchor portion 24 has a shoulder 20 remote from its terminal end. A sleeve 25 is disposed on the portion 24 and bottoms axially against the shoulder 20. A pair of elastomer bushings 27 are disposed in surface engagement with the sleeve 25, shoulder 20, and the frame member 12. Nut and washer means 26 threadably engage the terminal end of the crank arm anchor portion 24 and when drawn tight against the end of the sleeve 20 preload the bushings 27 to the desired value. Crank arm anchor portion 24 is both isolated from and securely anchored to the frame member 12.

The other or loading end of the torsion bar intermediate portion 23 is provided with an inwardly extending integral crank arm 28 which is connected to transmission extension 29. Crank arm 28 is journaled in a pair of elastomer bushings 31 which are restricted axially in one direction by shoulder 30 on the crank arm 28. Bushings 31 separate the crank arm 28 and the extension 29 and are preloaded to the desired value when the nut and washer means 32 are threadably secured upon the terminal end of the crank arm 28. Elastomer bushings 31 accommodate angularity movement of the crank arm 28 relative to the transmission extension 29.

Attachment of the torsion bar 22 to the transmission 19 is not restricted to the position shown in the drawings. The torsion bar 22 may be so positioned that the attachment to the transmission 19 may be made to the top or either side of the transmission 19. In this manner the underbody clearance is not encroached upon or reduced.

The supporting means for the torsion bar 23 is more clearly shown in FIGURE 3. An apertured support assembly 33 is secured to the frame support member 12 adjacent to the crank arm 28 by fastening means 35. A preloaded elastomer bushing 34 having an asbestos inner liner 36 is disposed within the aperture of the support assembly 33. Torsion bar intermediate portion 23 is journaled in the asbestos liner 36 with the torsion bar 22 being disposed in a substantially horizontal plane.

The elastomer bushing 34 has several functions. It serves to isolate the torsion bar 22 from the frame support member 12. It also damps vibrations and movement of the power unit relative to the frame support member and the frame support member relative to the power unit. The asbestos friction liner 36 may be used to obtain static friction damping.

An alternate embodiment of the invention is disclosed in FIGURES 5 and 6. The torsion bar indicated at 37 is provided with a separate anchor portion 38 splined to the terminal end of the intermediate portion 39. The anchor portion 38 is also provided with a shoulder 40 and secured to the frame 12 in the same manner as the anchor portion 24 in the embodiment of FIGURES 2–4. Elastomer bushings 27, sleeve 25, nut and washer means 26 cooperate in the same manner as heretofore described with respect to the embodiment of FIGURES 2–4.

The other end of the torsion bar intermediate portion 39 is provided with integral crank arm 41 that is likewise provided with a shoulder 45 and connected to the extension 29 of the transmission 19. A pair of elastomer bushings 42 however are confined within inner and outer sleeves 43 and 44. Sleeves 43 and 44 are positioned between the crank arm 41, the extension 29, and the shoulder 45. When the nut and washer means 32 are threadably secured upon the terminal end of the crank arm 44, bushings 42 are preloaded to the desired value and the unit is completely assembled.

The supporting means comprising the support assembly 33, elastomer 34, and liner 36 used and described with respect to torsion bar intermediate portion 23 of torsion bar 22 may also be used with the intermediate portion 39 of the torsion bar 37. The operation and function is the same.

It is contemplated and intended that the torsion bar mount may also be used as a front engine mount singly or in pairs. It is further contemplated and intended that the torsion bar may assume a variety of shapes and sizes. Furthermore, the attachment of the torsion bar to the power unit may be to the underside of the unit as shown, to the top side, or to either side of the power unit. Likewise, the torsion bar may be attached to any convenient point of the frame. Although a resilient connection is shown between the crank arm and the transmission, it is contemplated that any connection may be used which permits a limited pivotal movement between the torsion bar and the power unit.

It will be understood therefore that this invention is not to be limited to the exact construction shown and described but that various changes and modifications may be made without departing from the spirit and scope of the invention as defined in the appended claims.

I claim:

1. In a motor vehicle, in combination, a power unit, a frame, a torsion bar mounted between said power unit and said frame, said torsion bar having an intermediate portion, an integral crank arm at one end of the torsion bar intermediate portion, and an integral anchor portion at the opposite end of the torsion bar intermediate portion, means anchoring the anchor portion to the frame, resilient means connecting the crank arm to the power unit, and supporting means secured to said frame, said supporting means including resilient means engaging and resiliently supporting the torsion bar intermediate portion on a substantially horizontal plane, said integral crank arm restraining the power unit against fore and aft and lateral movement and translating vertical movement into torsional movement of the torsion bar.

2. In a motor vehicle, in combination, a power unit, a frame, resilient front mounting means disposed between said frame and said power unit, rear mounting means comprising a torsion bar having an intermediate portion substantially parallel to the longitudinal axis of the motor vehicle, a crank arm at one end of said intermediate portion, and an integral anchor portion at the other end of said intermediate portion, resilient means connecting the crank arm to the power unit, supporting means secured to the frame, said supporting means including an elastomer member engaging and resiliently supporting the torsion bar intermediate portion, said crank arm translating vertical movement of the power unit into torsional movement of the torsion bar intermediate portion, said elastomer member isolating said torsion bar from said supporting means and said frame and damping vibrations between said power unit and said frame.

3. In a motor vehicle, in combination, a power unit, a frame having longitudinally extending frame side rails, a torsion bar supporting part of said power unit on said frame and having a longitudinally extending body portion adjacent one of said frame side rails, means adjacent one end of said body portion anchoring said end to said frame side rail, a journal support adjacent the other end of said body portion supporting said end upon said frame side rail for oscillation about the axis of the body portion, resilient means in said journal support permitting limited movement of the last named end of said body portion in a direction laterally of the vehicle, and crank arm means extending laterally from the body portion of said torsion bar to said power unit and connected to a part of the latter to translate vertical movement of said power unit part into torsional oscillation of the body portion of said torsion bar, said resilient means accommodating limited lateral movement of said power unit part and said crank arm means controlling fore and aft movement of said power unit part.

4. The structure defined by claim 3 which is further characterized in that said journal support includes a friction element effective upon oscillation of the body portion of said torsion bar to dampen said oscillations and control resonant movement of said power unit part.

5. An engine mount for a motor vehicle having an internal combustion engine and a frame, said engine mount resiliently mounting the internal combustion engine upon the frame and comprising a torsion bar having one end adapted to be anchored upon the frame, a crank arm at another end of said torsion bar adapted to be connected to the internal combustion engine, supporting means adapted to be carried by the frame and supporting the torsion bar intermediate its ends for oscillation about its axis, and friction damping means carried by said supporting means to dampen oscillation of said torsion bar in response to movements of said engine relative to said frame.

6. An engine mount for a motor vehicle having an internal combustion engine and a frame, said engine mount resiliently mounting the internal combustion engine upon the frame and comprising a torsion bar having one end adapted to be anchored upon the frame, a crank arm at another end of said torsion bar adapted to be connected to the internal combustion engine, and supporting means adapted to be carried by the frame and supporting the torsion bar intermediate its ends for oscillation about its axis, said supporting means comprising a support mounted upon said frame, an apertured elastomer bushing carried by said support, and a liner of friction material in the aperture in said bushing to dampen oscillation of said torsion bar in response to movements of said engine relative to said frame.

7. In a motor vehicle, in combination, a power unit, a frame, a torsion bar mounted between said power unit and said frame, said torsion bar having an integral anchor portion at one end, means anchoring said anchor portion to said frame, said torsion bar further having a loading portion removed from said anchor portion, a crank arm connected at one of its ends to said loading portion, resilient means connecting the other end of said crank arm to said power unit, and supporting means secured to said frame, said supporting means including resilient means engaging and resiliently supporting said torsion bar intermediate its loading and anchor portions, said crank arm and said torsion bar being effective to restrain said power unit against movement parallel to the axis of said torsion bar and normal to said torsion bar axis along the line of said crank arm.

References Cited in the file of this patent

UNITED STATES PATENTS

| | | |
|---|---|---|
| 1,050,761 | Clark | Jan. 14, 1913 |
| 1,753,839 | Skelton | Apr. 8, 1930 |
| 1,789,971 | Ford | Jan. 27, 1931 |
| 1,890,871 | Trott | Dec. 13, 1932 |
| 1,941,763 | Swennes | Jan. 2, 1934 |
| 2,055,279 | D'Aubarede | Sept. 22, 1936 |
| 2,107,606 | Gemmer | Feb. 8, 1938 |
| 2,209,457 | Hare | July 30, 1940 |
| 2,631,844 | Paton | Mar. 17, 1953 |

FOREIGN PATENTS

| | | |
|---|---|---|
| 47,288 | France | Dec. 4, 1936 |
| 964,615 | France | Feb. 1, 1950 |
| 207,169 | Australia | Mar. 20, 1957 |